Figure 1:
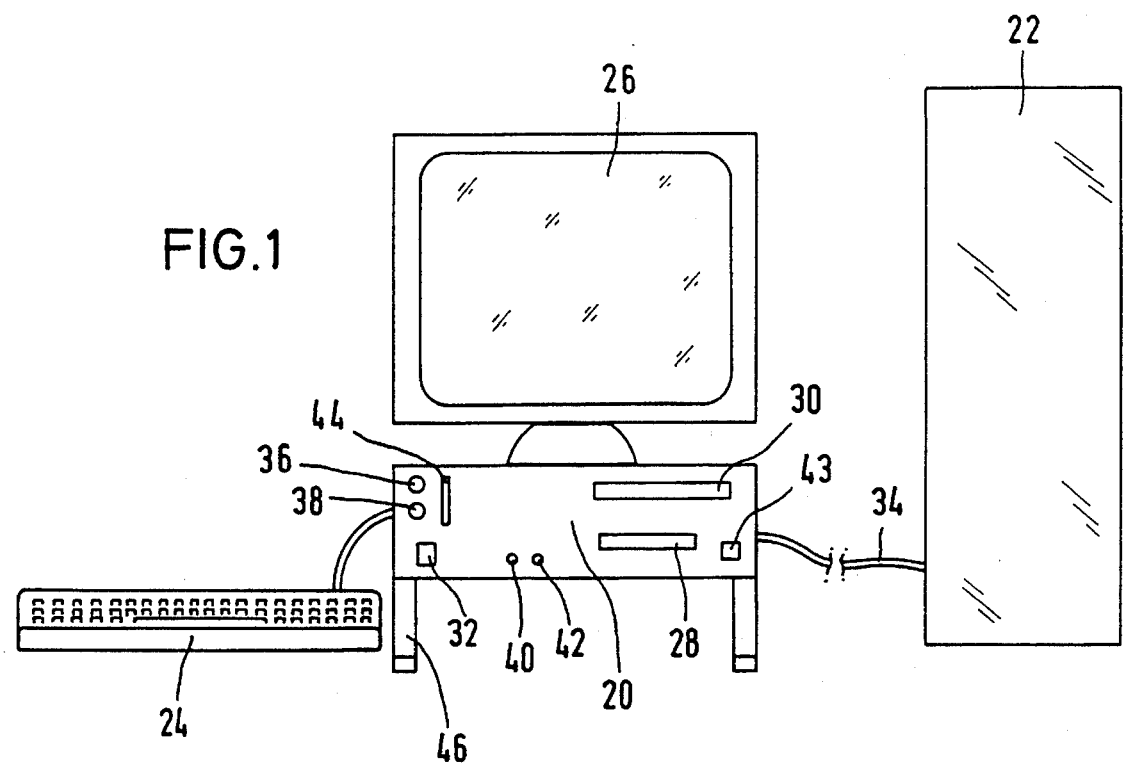

United States Patent [19]

Dahmen

[11] Patent Number: 5,621,612

[45] Date of Patent: Apr. 15, 1997

[54] MICROCOMPUTER WITH A COMPUTER CASE, A CONTROL CASE, A MONITOR AND A KEYBOARD

[75] Inventor: Heinz-Willi Dahmen, Aachen, Germany

[73] Assignee: VOBIS Microcomputer AG, Würselen, Germany

[21] Appl. No.: 382,033

[22] PCT Filed: Jun. 13, 1994

[86] PCT No.: PCT/DE94/00658

§ 371 Date: Jun. 2, 1995

§ 102(e) Date: Jun. 2, 1995

[87] PCT Pub. No.: WO94/29783

PCT Pub. Date: Dec. 22, 1994

[30] Foreign Application Priority Data

Jun. 13, 1993 [DE] Germany ............... 43 19 407.9

[51] Int. Cl.⁶ ............... H05K 7/14; G06F 1/16
[52] U.S. Cl. ............... 361/683; 364/708.1; 312/223.2
[58] Field of Search ............... 361/679, 680–686, 361/724, 725, 727; 312/208.1, 208.2, 208.3, 208.4, 223.1, 223.2, 223.3; 364/708.1; G06F 1/16

[56] References Cited

PUBLICATIONS

IBM Technical Disclosure Bulletin Vo. 36 No. 09A Sep. 1993.
BYTE, Dec. 1992 "Desktop Multimedia" p. 72.

*Primary Examiner*—Leo P. Picard
*Assistant Examiner*—Lynn D. Feild

[57] ABSTRACT

A microcomputer including a computer casing, a monitor and a keyboard along with an additional control unit having a main power switch, a plug-in socket for a keyboard, a connector for a mouse and a connector for a microphone, the control unit being much smaller than the computer casing.

7 Claims, 1 Drawing Sheet

MICROCOMPUTER WITH A COMPUTER CASE, A CONTROL CASE, A MONITOR AND A KEYBOARD

The invention relates to a microcomputer having a computer case, a monitor and a keyboard, which are interlinked and have at least one main connector.

There are two different types of casings for microcomputers at present, namely desktop casings and casings for upright position. Desktop casings present the advantage, that the disk drives are easily accessible, but they have the disadvantage, that the desktop case takes away quite a lot of space of the usable surface of a desk. This disadvantage is not relevant for stand up casings, of course, but they have the disadvantage, that the openings of the disk drives are difficult to access, the same holds for further operating elements of the computer casing.

The computer casing of a microcomputer of the kind mentioned above houses the components of a microcomputer, which are relevant for data processing, especially the motherboard (main board), power-supply, at least one drive for interchangeable dater carriers, for the most part a hard disk, the accompanying controllers and cards, as for example graphic cards, which are located in slots of the main board provided therefore. Furtheron signalling lamps are arranged in the computer case informing about the on-state, the function of one or more drives. Finally some computers have a reset push button for easily initiating a system reset.

It is the aim of the invention, to further develop a microcomputer of the kind mentioned above in such a way, that on one hand the control elements of the computer casing are within easy reach of a user, as generally is the case for a desktop unit, but without having to accept the disadvantages of the desktop casing, that is without the desk space required for a desktop casing. The invention aims at the idea to combine the advantages of a desktop casing with those of a stand-up casing, without having to accept the disadvantages of both.

This object is solved by a microcomputer having an additional control case.

The main and important control elements are taken away from the computer casing and are arranged in the control case, which is small in relation to the computer casing. Only those elements remain in the computer casing, which do not need a separate access from outside, i.e. the motherboard with cards inserted therein, power supply, hard disk drive etc. The drives, which accept a disk or an interchangeable data carrier are arranged in the control case. There they occupy most of the space available. Furtheron the connectors for the keyboard, a mouse and a microphone are arranged in the control case. The microcomputer is switched on and off by a mains switch, which is arranged in the control case. By this means a user does not need to have access to the computer casing during normal use of a microcomputer, no manipulations at the computer casing are necessary then. All operating steps are preformed at the control case. This control case (also called control unit) is made small enough to fit under the base of a commercial monitor. The control case being smaller in weight than the computer casing can be carried by normal swivel supports for monitors. A computer case provides a support for the monitor, which is put atop of the upper face thereof.

In a further and especially preferred embodiment the control case forms a foot of a monitor, i.e. has on it's upper face all the necessary equipments for locating and tilting a monitor, preferably the upper face of the control case is a base portion of a monitor.

As the size of the control case is mainly determined by the number of drives, which are to be arranged in the control case, and as a control case should be as small as possible, a maximum size is aimed at, which is sufficient for accommodating four drives. For the further discussion the reference-size will be the size of a 5¼ inch drive. Preferably the control case can accommodate a maximum of four drives. In praxis they are CD-ROM, 3½ inch and 5¼ inch drives.

In a preferred embodiment a single trunk connects the control case and the computer casing. This simplifies the set up of the microcomputer. The trunk, e.g. a multiple cable incorporates connections to the individual drives, furtheron comprises a main control line, which preferably is a low-voltage line and is used to operate a relay, which switches the main power in the computer casing, furtheron a connector for the keyboard, connectors to a built-in or an external loudspeaker, eventually connectors for a microphone and also for individual indicating lamps, which are preferably arranged in the control unit and indicate the one/off-state, the operation of a hard drive etc.

In an especially preferred embodiment the control case comprises supporting feet, which are formed as L-shaped or U-shaped bows or frames. They are open toward the front and are high enough, so that the keyboard can be shifted between the frames and the lower face of the control case. The keyboard may be much broader than the control case, but the described arrangement offers a location for the keyboard underneath the control case whenever the microcomputer is not in use, e.g. on a swivel carrier for a monitor.

The control case according to the invention is an additional part of the microcomputer. The total price of a complete microcomputer will not be raised considerably by the additional part, as the control case houses the essential parts, which are otherwise located in the computer casing, especially the drives. Insofar the invention may be understood and explained in such a manner that the computer casing of a microcomputer according to the state of the art is divided up into two separate casings, namely a casing for the remainder computer and a control case. Insofar the additional expenses which are due to this splitting up are mainly expenses for the casing of the control case, the additional assembly and the additional cable connections.

Further advantages and features of the invention result from the further claims and the following description of a non-limiting embodiment of the invention, which is further explained below with reference to the drawing. The drawing shows in:

FIG. 1: A front view of a microcomputer with the control case of the invention and FIG. 2: a side elevation of a monitor, a control case, and a keyboard of a microcomputer according to FIG. 1.

As shown in the figures the microcomputer has an additional part, namely a control case 20. The microcomputer furtheron comprises the following, known components: computer casing 22, keyboard 24, and monitor 26. Further components, as for example a printer, a mouse and the like are not shown, a can be added in a known way, of course.

The control case is rather small compared with the computer casing 22, the maximum size of the control case 20 is intended to be defined such that a maximum of four standard drives can be arranged in the control case 20. A 5¼ inch drive has outer dimensions of 15×4,5×21 cm (approximate dimensions), the dimensions of the control case 20 should be four times these dimensions, i.e. approximately 30×9×21 cm. The control case 20 has no separate power supply, the necessary power is taken from the computer casing 22, which lodges a power supply.

Drives 28, 30 are accessible at the front panel of the computer case 20, in the example shown two drives are provided. Furtheron an on/off switch for a supply voltage is located on the front panel, this switch is formed as a push button. The switch controls a relay or the like, which is arranged in the computer casing 22. This avoids that the full supply voltage is carried by a connection line 34 (trunk) connecting the computer casing 22 and the control case 20. Furtheron a plug-in connector 36 for a microphone and a plug-in connector for a headset or an additional loud-speaker are provided at the front panel. Passages 40, 42 for indicating lamps are arranged in the front panel, in the embodiment shown there is an indicator for the on-state of the computer and an indicator which lights up during operation of the hard drive, which drive is still housed in the computer casing.

A system reset switch 43 may be arranged on the front panel, thereby a system reset, which is possible by depressing keys of the keyboard, too, may be preformed.

A multi-point connector for the connection line 34 is arranged at the backside of the control case 20 and serves for a connection with the computer casing 22. In the preferred embodiment shown there is only one connection line 34 incorporating a plurality of individual connecting lines corresponding to the number of connector points of the multi-point connector. Furtheron there is a plug-in socket for a keyboard 24 and an attachment for a mouse on the back side of the control case 20, the mouse may be wireless, i.e. without the need of a cable connection.

The control case has a solid casing constructed so that the weight of a normal monitor 26 can be supported. Preferably the casing is made of plastic or sheet steel.

In a very advantageous embodiment and as shown in FIG. 1 a reader 44 is arranged in the control case 20 and is accessible through a slit in the front panel. A card for securing access, especially in the size of a credit card, is inserted them. The computer does not start unless the security device is inserted, in a preferred embodiment the power switch may be arranged in or attached to the reader 44. In this case the power switch is operated by inserting a card for securing access into the reading area of the reader 44. Cards for obtaining access are especially those having a magnetic layer and especially cards incorporating integrated circuits.

Figure 2:
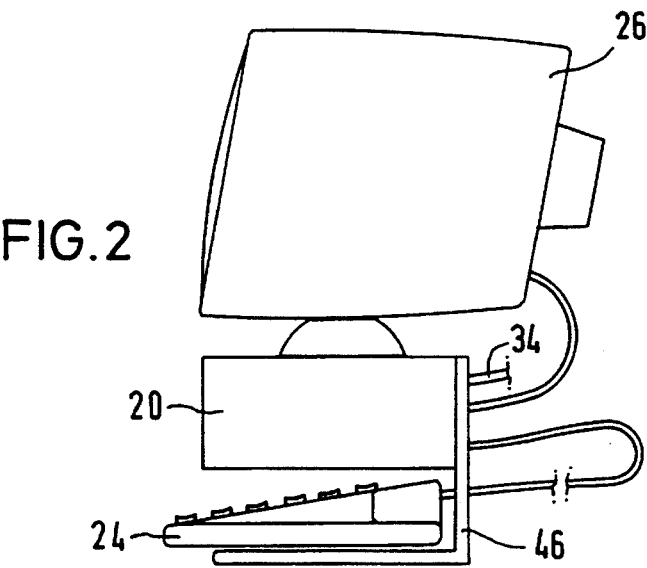

As especially shown in FIG. 2, there are two bow-shaped, frame-like feet 46 having L-shape underneath the control case, they are realizably fixed to the two side areas of the control case 20. They are made of a solid material, for example a metallic tube of circular or rectangular cross section and are open toward the front side of the control case 20. A vertical leg of the L is realizably fixed to the back face of the control case 20. The free distance between a horizontal leg of the L and the bottom face of the control case 20 is suitably chosen so that a standard keyboard may be shifted onto the legs and fits between these and the lower face of control case 20, as shown in FIG. 2.

In a different embodiment the feet 46 are U-shaped, they have two horizontal and one vertical leg. One horizontal leg is fixed to the lower surface of the control unit 20. Altogether the same configuration as shown in FIG. 2 is obtained, again the keyboard 24 may be parked between the lower face of the control case 20 and the lower horizontal leg of feet 46.

A loudspeaker is arranged in the control unit 20, whereas in the state of the art this loudspeaker is arranged in the computer casing. Additional loudspeakers, especially stereo-loudspeakers may be connected to the control unit 20, a plug-in socked 38 mentioned above is use for this purpose.

The control unit 20 is considerably smaller in weight than the computer casing 22. A typical weight of a control case is about 1.5 kg.

I claim:

1. A microcomputer comprising:
   a computer casing (22), a monitor (26) and a keyboard (24), which are interlinked and with a main power supply, an additional control unit (20) having at least one drive (28, 30) for interchangeable data carriers and a loudspeaker and in which the control unit incorporates a main power switch (32), a plug-in socket for a keyboard (24), a connector for a mouse and a connector (36) for a microphone, the control unit being much smaller in volume than the computer casing (22) and occupying an area of the size of a monitor base.

2. The microcomputer according to claim 1, in which the control unit (20) houses a maximum of four drives (28, 30).

3. The microcomputer according to claim 1, in which the height of the control unit (20) is a maximum of 2.5 times the height, and the width of the control unit (20) is a maximum of three time the width of the corresponding dimensions of a standard 5¼ inch drive.

4. The microcomputer according to claim 1, in which the control unit (20) is interconnected via a single multiple cable (34) with the computer casing (22).

5. The microcomputer according to claim 1, in which the control unit (20) comprises a connector (38) for a headphone.

6. The microcomputer according to claim 1, in which the control case (20) houses a maximum of four drives (28, 30) with interchangeable data carriers.

7. The microcomputer according to claim 1, in which the control unit (20) has feet (46) at its bottom face which are made of bended bows open toward the front face of the control unit (20), the dimensions being chosen so that a keyboard (24) may be parked between these feet (46) and the lower face of the control unit (20).

* * * * *